April 22, 1952 C. E. WELLER 2,593,947
ELECTRICALLY HEATED APPARATUS
Filed May 22, 1946
2 SHEETS—SHEET 1
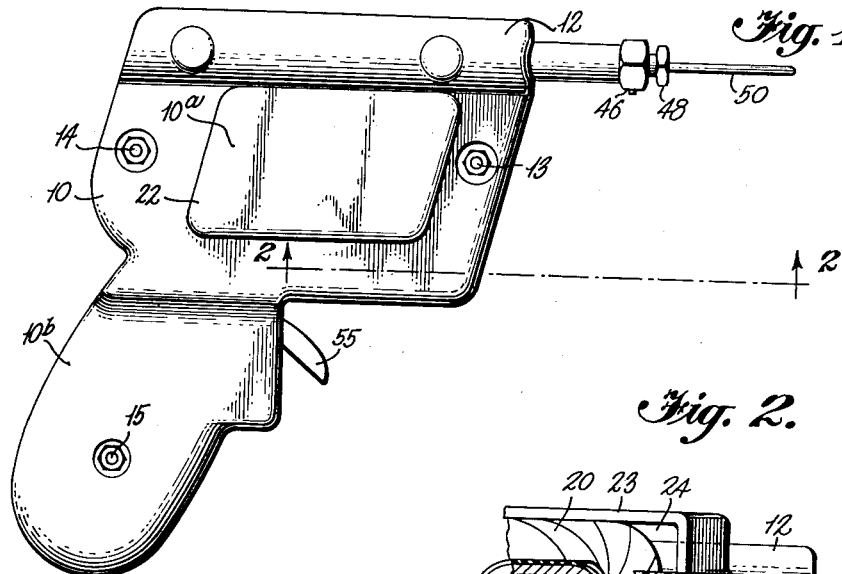
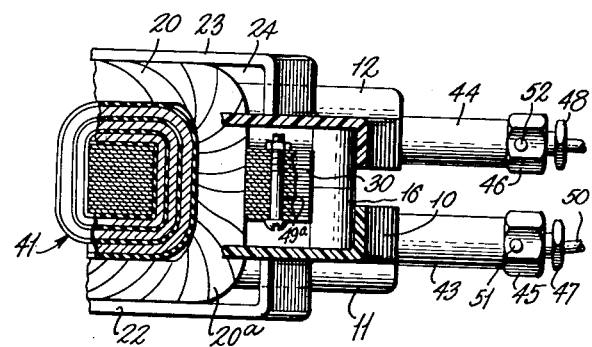
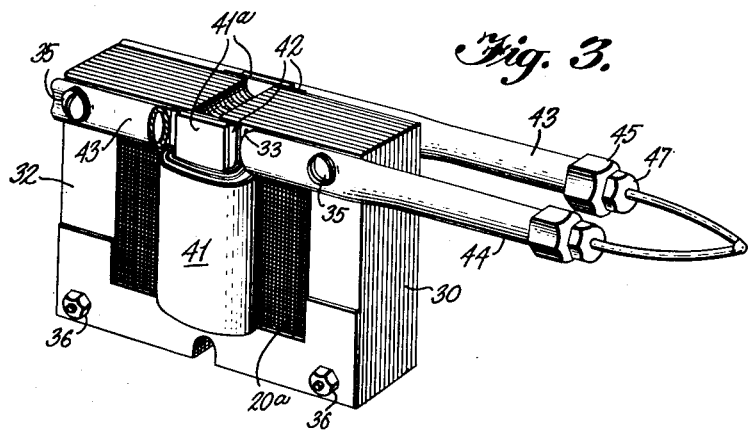
INVENTOR
*Carl E. Weller*
BY *Mason, Fenwick & Lawrence*
ATTORNEYS April 22, 1952  C. E. WELLER  2,593,947
ELECTRICALLY HEATED APPARATUS
Filed May 22, 1946  2 SHEETS—SHEET 2
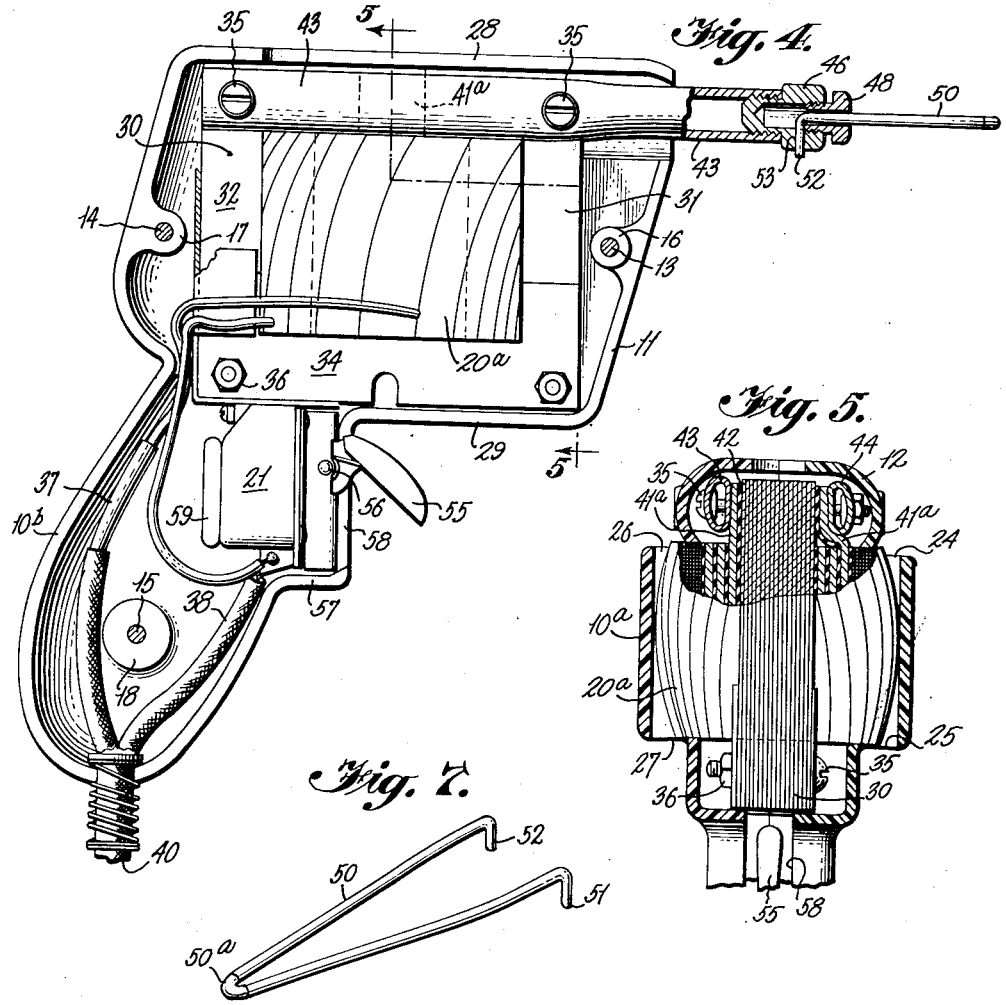
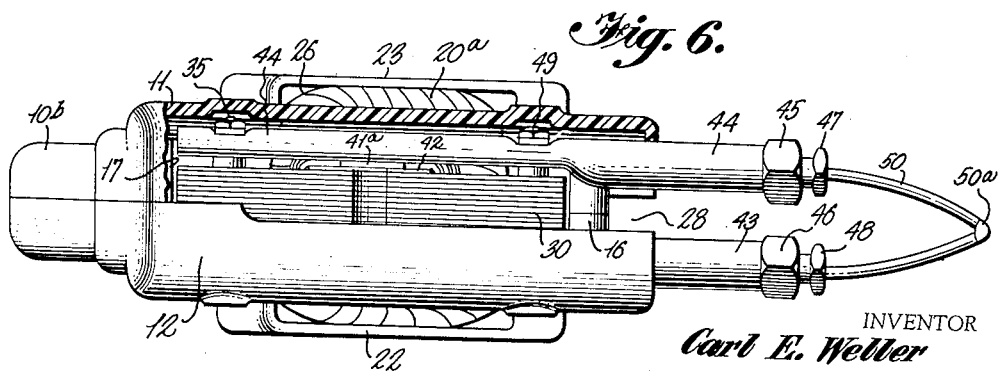
INVENTOR
Carl E. Weller
BY Mason, Fenwick & Lawrence
ATTORNEYS Patented Apr. 22, 1952

2,593,947

UNITED STATES PATENT OFFICE 2,593,947

ELECTRICALLY HEATED APPARATUS

Carl E. Weller, Easton, Pa.

Application May 22, 1946, Serial No. 671,455

6 Claims. (Cl. 219—26)

This invention relates to electrically heated apparatus and more particularly to electrically heated soldering apparatus for intermittent use.

An object of the invention is to provide an electrically heated apparatus which will be simple and durable in construction, convenient in design and efficient and economical in operation.

Another object of the invention is to provide in a soldering iron an easily tinnable tip which may be heated quickly and with a minimum current consumption.

Another object of the invention is to provide a well ventilated soldering iron to the end that the heat of frequent intermittent or long continued use will be advantageously rapidly conducted away from the leads of the iron.

Another object of the invention is to provide in an electric soldering iron a control switch of convenient and efficient design.

The invention contemplates a soldering iron of pistol-grip type, having a readily renewable tinned copper tip at one end, a finger-actuated control switch comprising toggle and spring lever elements at the other end, and an intermediate step-down transformer unit.

The invention will be readily understood by referring to the following detailed specification including the several drawings forming part thereof, wherein Fig. 1 shows in side elevation the exterior of an electric soldering iron constituting a preferred embodiment of the invention:

Figure 2 is a fragmentary section view of the preferred embodiment of the invention taken along the lines 2—2 of Figure 1.

Figure 3 is a perspective view of the step-down transformer and conductive secondary loop of the preferred embodiment of the invention, illustrating the manner in which the several parts making up these components are assembled to produce a stress resistant structure;

Fig. 4 is a side view corresponding to Fig. 1 but showing portions removed to illustrate the interior disposition of the element;

Figure 5 is a fragmentary section view of the preferred embodiment of the invention taken along the lines 5—5 of Figure 4;

Figure 6 is a top plan view of the preferred embodiment shown in Figure 1, with parts of the casing broken away to illustrate the internal construction of the device; and Fig. 7 is a detail perspective of a copper tip.

With continued reference to the drawings wherein similar reference numerals are used to designate the same parts throughout, and particularly to Figures 1, 2, 3 and 6, the casing or housing 10 for the soldering tool is made in two separable parts 11 and 12, which may be identical in all respects except that one is right hand, and the other left hand.

The housing is preferably formed of molded material such as hard rubber or synthetic resin but could be made from metal castings or stampings without in any way exceeding the scope of the invention.

The two parts are held in assembled relationship by a plurality of threaded elements 13, 14 and 15 which extend through apertured integral bosses 16, 17 and 18, Fig. 4, formed internally of each housing half 11 and 12. The inner ends of the bosses abut to hold the housing halves in properly spaced relationship and the ends of the apertures are counterbored to receive the heads and nuts of the threaded elements, the nut-receiving counterbores being preferably hexagonal in shape.

When the housing halves are in assembled relationship they provide a hollow body portion 10a inclosing a step-down transformer 20, and a pistol grip portion 10b inclosing a manually controlled on-and-off switch 21.

The major part of the body portion 10a has a thickness less than the major thickness of the transformer and is provided with opposed offset portions 22 and 23 which fit around the sides of the transformer coil.

The top and bottom parts of the off-set portions are left open, as indicated at 24, 25, 26 and 27 in Figs. 2, 5 and 6 to provide ventilation for the transformer coil and the casing halves have their meeting edge portions cut away in the forward part of the body portion 10a to provide an upper ventilating slot 28 and a lower ventilating slot 29 to permit a flow of cooling air past the transformer.

Referring now to Figures 3 and 4, the transformer 20 includes a rectangular frame 30 of laminated iron which may be of any desirable dimensions and construction.

It has been found convenient to employ for this purpose a core area of one inch by ⅝ inch steel. Frame 30 includes opposite ends 31 and 32, top 33 and bottom 34, the laminae being assembled by spaced corner bolts 35, tightened by nuts 36. The primary winding of the transformer, indicated at 20a is designed to use 115 volt alternating current, although, of course, the invention is not limited thereto. Leads 37 and 38 connect the transformer to conductor cord 40 attached at any suitable source of electrical power, not shown. Transformer secondary winding 41, Fig. 2, is designed to furnish 400 amperes at one-quarter volt. In one satisfactory embodiment the primary winding 20a includes 715 turns of #25 wire while secondary winding 41 consists of 2½ turns of thin copper strip inside the primary winding. The turns are separated by a strip of insulating material and upright extensions 41a on the copper strip ends are brought out along the top of frame 30 from which they are separated by insulation 42.

The housing 10 is provided with marginal wall or flange portions which fit about the transformer frame to securely support the transformer in the housing.

A pair of substantially parallel tubular members 43 and 44, preferably of copper, are disposed one at each side of the upper part 33 of transformer frame 30 and are substantially parallel with the top surface of the frame.

These tubular members each have one end near the rear end of the transformer frame and extend forwardly of the frame and through the front end of body portion 10a of the tool housing. At their front ends the tubular members are internally threaded to receive threaded plugs 45 and 46 provided with screw threaded bores which receive respective apertured threaded nuts 47 and 48.

The portions of the tubular members overlying the transformer frame are preferably somewhat flattened and are secured to the frame by the upper corner bolts 35. The heads and nuts of these corner bolts pass through enlarged apertures 49a in the outer walls of the tubular members and engage the inner walls thereof. The bolts and tubular members are insulated from the frame by suitable sleeves of insulating material which surround the bolts and project at their ends beyond the frame to abut the tubular members and maintain them spaced from the frame. The ends of the secondary winding strip are electrically connected to the respective tubular members between the corner bolts. Members 43 and 44 are tubular in order to dissipate heat.

The soldering tip constitutes a forward extension of the secondary leads and comprises a hairpin-shaped loop 50 of copper wire having bent over end portions 51 and 52. This tip is of pronouncedly smaller cross section throughout than the remainder of the secondary and serves as a shunt conductor across the secondary winding, the substantially V-shaped extremity 50a being tinned. This tip is readily replaceable and its cost is insignificant. It is attached to the two tubular members 43 and 44 by first having the clamping nuts 47 and 48 passed over the respective end portions and the bent over end portions 51 and 52 inserted into the hollow plugs 45 and 46 and through respective radial apertures, as indicated at 53 in Fig. 4, extending through the polygonal head portions of the plugs. The nuts 47 and 48 are then threaded into the plugs to tightly jam the bent over end portions of the wire tip against the sides of the apertures 53.

Both the plugs and nuts are provided with polygonal head portions so that tools, such as wrenches or pliers, may be used to turn them.

The trigger is so arranged that the iron current is normally cut off.

Desirable intermittent operation of the soldering iron is very conveniently obtained by inward and outward movement of trigger 55, the same being pivotally mounted on a pin 56 carried by the housing of switch 21, the latter preferably being of known design. The trigger has a curved forward face for comfortably accommodating the operator's finger at the grip and is springpressed outwardly.

Switch 21 is connected into lead 38 from cord 40 to the transformer and is received in a receptacle in the housing constituted by the outer wall portions 57 and 58, a portion of the bottom surface of the transformer frame and the partition members 59 projecting inwardly from opposite sides of the tool housing.

In operation the soldering iron tip 50 is heated by tightening the finger grip on the trigger 55, pulling the latter against the spring tension and causing current to flow through the transformer and rapidly heat the tip. When the pressure on the trigger is released, trigger 55 moves forwardly and reopens the switch, thus cutting off the flow of current to the tip.

From the foregoing it will be observed that the conventional alloy tips are dispensed with. By substituting copper wire for alloy tips tinning of the tip is facilitated. The copper material of the tips is quite cheap and deterioration is readily corrected by replacing the tip. Replacement of a copper tip is easily accomplished since it is necessary only to loosen nuts 47 and 48 and withdraw the old copper tip. The ends of the new copper tip may then be inserted through axial bores in plugs 45 and 46 the turned up ends 51 and 52 being then rigidly tightened into position by taking up on nuts 47 and 48, the soldering iron being thus almost instantly ready for use.

The construction described enables actuation of the iron with maximum convenience and economy, it being possible to heat the tip and to cool the tip, when desired, in successive periods of very few seconds. Intermittent usage as in constant utilization does not cause the tool unduly to heat up because the tubular construction of the parallel members 43 and 44 insures heat loss and the ventilating openings at the top, front and bottom of the main casing, and the ventilating openings at the top and bottom on each side of the transformer winding contribute to elimination of uncomfortable or deleterious temperatures.

The compact but sturdy design shown and described enables the tool to be comfortably balanced and held operatively in the hand while providing housing protection in a durable device.

It will be understood that the specific details of construction set forth hereinabove describe merely one preferred form of the invention which is capable of many other modifications; hence the invention is not to be limited other than by the spirit and scope of the appended claims.

I claim:

1. An intermittently operable electric soldering tool comprising a two part housing of moldable material having ventilating slots therein and constituting a body portion and a grip portion; a transformer having a substantially rectangular metal frame mounted in said body portion between said slots; a pair of tubular conducting members mounted on said frame but insulated therefrom and projecting beyond the front of said body portion, the secondary winding of said transformer having its ends connected respectively with said tubular members; a hairpin shaped loop of copper wire constituting a soldering tip for said tool; threaded members connecting the ends of said tip to the ends of said tubular members, a power cord connected with said tool; leads connecting said power cord with said transformer; a switch mounted in said grip portion and connected into one of said leads; and a switch trigger extending from said grip portion for manual control of said switch.

2. An electrical heating apparatus comprising a quick-heating soldering iron including a step-down transformer having a frame and primary and secondary turns, said secondary turns being of pronouncedly greater cross-sectional area than said primary turns, a detachable heating tip rigidly mounted and held tight in electrical communication with the secondary winding, said heat tip being of pronouncedly smaller cross-sectional area than the secondary winding, and a two-part pistol shaped housing enclosing said transformer, said housing having marginal wall portions contacting the transformer frame to support said transformer in said housing, said housing also having opposed offset portions which fit around the sides of the transformer, said offset portions having apertures to provide ventilation for the transformer, the housing having additional upper and lower ventilating slots respectively to permit a flow of cooling air past the transformer.

3. An electrical heating apparatus comprising a quick heating soldering iron including a step-down transformer having a rectangular frame and primary and secondary turns, said secondary turns being of pronouncedly greater cross sectional area than said primary turns, a pair of rigid conductive rods of large cross section having portions overlying a leg of said transformer frame and rigidly secured thereto in electrical communication with said secondary turns, a detachable heating tip of low specific resistance material rigidly mounted and held tightly in electrical communication with the free ends of said conductive rods in shunting relation therewith, said heating tip being of pronouncedly smaller cross section than said conductive rods and said secondary turns, and a two-part pistol shaped housing enclosing said transformer, said housing parts having bosses formed therein for contacting the opposite sides and ends of said transformer frame when the housing is assembled and fixedly supporting said transformer in spaced relation within said housing.

4. An electrical soldering tool of the quick heating type having a pistol shaped housing, comprising a step-down transformer having a rectangular laminated core including a plurality of legs, a secondary winding comprising a metallic ribbon wound about said transformer core and terminating in exposed ends overlying opposite sides of one leg of said transformer core and insulated therefrom, a primary winding wound about and enveloping said secondary winding, the turns of said secondary winding being of pronouncedly larger cross section than the turns of said primary winding, a pair of rigid elongated conductors disposed in parallel relation and having portions thereof overlying along the length of and insulated from said one leg of said transformer core, means rigidly securing the overlying portion of said conductors to said one leg with said exposed ends of said secondary winding frictionally clamped between said conductors and the sides of said one leg and in electrical contact with said conductors, and a highly conductive wire soldering tip connected between the ends of said conductors remote from said transformer, said soldering tip being of pronouncedly smaller cross section than said conductors.

5. In a quick heating electrical soldering gun having a step-down transformer including a transformer primary, a highly conductive secondary having windings of pronouncedly larger cross section than the turns of the transformer primary and a detachable heating tip of highly conductive material of pronouncedly smaller cross section than the remainder of the secondary shunting the secondary windings, a transformer core for said transformer having a plurality of legs defining a rectangular frame, the secondary of said transformer comprising said windings formed of a highly conductive metallic ribbon wound about said transformer core and terminating in exposed ends overlying opposite sides of one leg of said transformer and insulated therefrom, a pair of rigid elongated conducting rods exposed in parallel relation and having portions thereof overlying the length of and insulated from said one leg of said transformer core, and means securing the overlying portions of said conductive rods to said one leg of said transformer core for rigidly mounting said rods thereon and for frictionally clamping said exposed ends of said secondary winding in electrical contact therewith between said conducting rods and the sides of said one transformer core leg, said detachable heating tip being rigidly mounted and held tightly in electrical communication with the projecting ends of said conducting rods.

6. An electrical soldering tool comprising a step-down transformer having a metallic core formed of a plurality of legs defining a substantially rectangular frame, a secondary winding formed of metallic ribbon disposed centrally within said rectangular frame having terminal ends thereof disposed overlying opposite sides of one leg of said metallic core and insulated therefrom, a primary winding for said transformer wound about said secondary winding in enveloping relation and disposed wholly within said rectangular frame, the turns of said secondary winding being of pronouncedly larger cross section than the turns of said primary winding, a pair of large cross section rigid conducting rods projecting beyond said transformer core and having portions congruent with a portion of said core and extending over the length of at least one of said legs overlying the opposite sides of said core portion adjacent the exposed secondary ends and insulated therefrom, rigidly securing said rods to said core with said exposed secondary ends in electrical contact therewith and frictionally clamped between said rods and the adjacent sides of said core, and a substantially U-shaped heating tip of highly conductive material of pronouncedly smaller cross section than said secondary winding and said rods in electrically conductive connection therewith.

CARL E. WELLER.

REFERENCES CITED

The following references are of record in the file of this patent:

UNITED STATES PATENTS

| Number | Name | Date |
|---|---|---|
| Re. 13,154 | Gin | Oct. 4, 1910 |
| 488,871 | Coffin | Dec. 27, 1892 |
| 2,106,439 | Schubert | Jan. 25, 1938 |
| 2,200,322 | Arnesen | May 14, 1940 |
| 2,405,866 | Weller | Aug. 13, 1946 |
| 2,570,762 | Caliri | Oct. 9, 1951 |

FOREIGN PATENTS

| Number | Country | Date |
|---|---|---|
| 389,309 | Germany | Feb. 7, 1924 |
| 787,065 | France | Sept. 16, 1935 |
| 893,094 | France | May 30, 1944 |